Jan. 5, 1965
S. REDNER
3,164,014
LOAD CELL INDEPENDENT OF NON-AXIAL LOADING EFFECTS
Filed Aug. 22, 1962
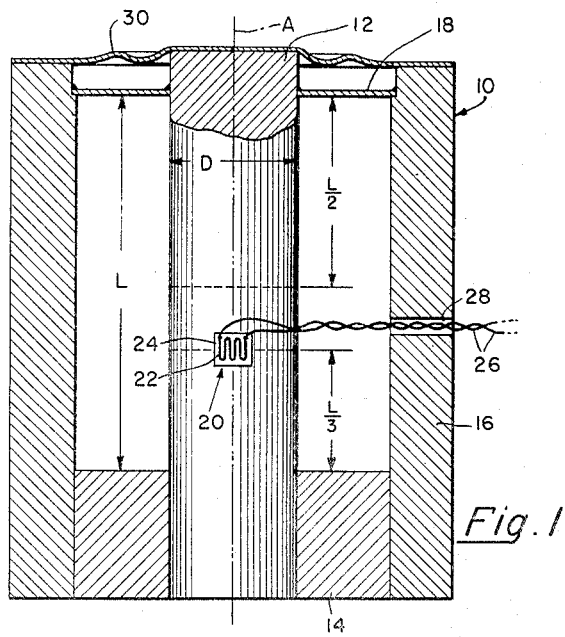
Fig. 1
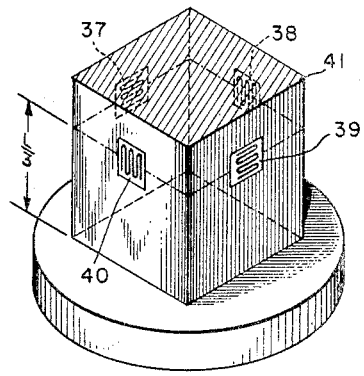
Fig. 6
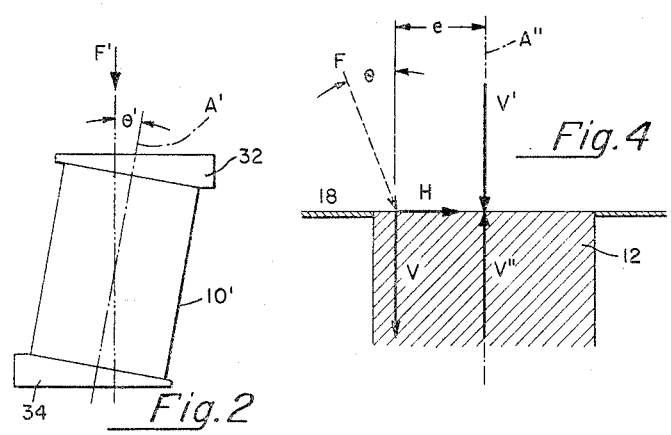
Fig. 2
Fig. 4
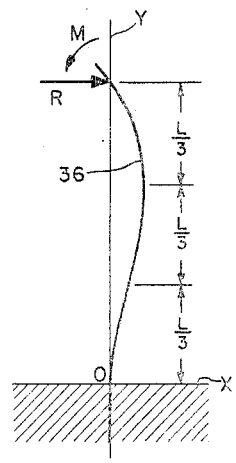
Fig. 5
Fig. 3
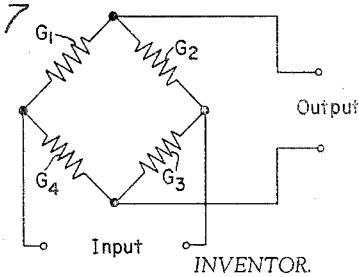
Fig. 7
INVENTOR.
SALOMON REDNER
BY
ATTORNEY

United States Patent Office 3,164,014
Patented Jan. 5, 1965

3,164,014
LOAD CELL INDEPENDENT OF NON-AXIAL LOADING EFFECTS
Salomon Redner, Norristown, Pa., assignor to The Budd Company, Philadelphia, Pa., a corporation of Pennsylvania
Filed Aug. 22, 1962, Ser. No. 218,728
6 Claims. (Cl. 73—141)

This invention pertains to load cells for the measurement of axial loads and more particularly to such load cells as adapted to yield outputs which are substantially independent if parasitic, non-axial, loads.

Load cells generally comprise a spring element, a column of steel or the like, adapted to receive an applied load and to be deformed elastically at a portion of its surface in response to variable load magnitudes. A strain sensitive transducer is applied to that surface to generate an output proportional to strain variations along the sensitive length, gauge length, of the transducer. Usually the transducer is a bonded resistance strain gauge having parallel sensitive filaments which define gauge length. The parallel filaments, however, are spaced apart and together subtend an area of the gauged surface.

In most important load cell applications, the spring element exhibits symmetry about a longitudinal axis and the objective is to generate an indication which depends solely upon the axial component of an applied load. In general, however, loads to be measured are not purely uni-axial as they are accompanied by considerable lateral and rotational components.

A primary aim of contemporary load cell configurations has been to eliminate the effects of these parasitic loads upon the load cell output. One approach has been to employ load cell components which shunt parasitic loads around the gauged areas of the spring element. A second has been the use of an array of transducers spaced circumferentially about the spring element and arranged in a circuit to balance out parasitic loading effects. None of the prior designs has been entirely successful, however, in reducing the parasitic effects to below the practical limits which are imposed by inherent errors in the remainder of the load cell system.

Perhaps the most successful contemporary design is that of a columnar spring element having one end fixed in a substantially rigid base which is in turn affixed to a substantially rigid shell encompassing the spring element and having the parasitic load shunting paths completed by one or more annular diaphragms connecting the upper end of the spring element to the shell. The diaphragms are relatively flexible in the axial load cell direction so as to allow axial loads to be transmitted to the spring element but are relatively rigid in the radial direction and unload or shunt parasitic loads to the rigid shell. In these designs the gauged surface area of the spring element is invariably at the mid-point of the spring element length to avoid end effects on the spring element from the portions of the parasitic loading which must be borne by the spring element.

Theoretically, a circumferential array of bonded resistance strain gauges connected alternately in the usual bridge-type output circuit should cancel out parasitic effects since any bending of the spring element may be equated to compression at one side surface and an equal tension on the opposite side surface. To within the extreme limits of precision of the load cell art, however, no two strain gauges are alike. Further, no two strain gauge applications are alike because of variations in adhesive thickness, spacial orientation, heat dissipation paths, and so forth. The combination of rigid base, rigid shell and annular diaphragm is not a perfect shunt for parasitic loads since the spring element must develop an elastic curve to be able to transfer loads to the shunting arrangement.

For the above reasons it has been necessary for load cell specifications to contemplate some output errors due to parasitic loadings. For example, a standard specification for maximum parasitic loading effect states that when the design load is applied at 3° from the axial direction of the load cell, the output may deviate from the output for pure axial loading by about .3%. This is not an insignificant error; it is a recognition of what is believed to be the practical limitation upon load cell design.

It is therefore an object of this invention to provide a load cell combination which substantially reduces output dependence upon non-axial loading effects.

It is a further object of this invention to provide a load cell combination which yields outputs substantially independent of non-axial loading magnitudes and directions encountered in practical load cell applications without requiring complex structural configurations and multipart designs.

In furtherance of the above objectives, I have discovered that location of the gauged strain area other than at the mid-point of a load cell column length, rather than creating difficulties due to end effects, actually reduces parasitic dependence. In a simple single diaphragm rigid shell and base structure, the axial location of that area is very nearly one-third of the distance between the fixed end of the column at the base and the supported end of the column at the diaphragm.

The features of my invention which are believed to be novel are pointed out with particularity in the appended claims. However, for a better understanding together with further objects and advantages thereof, reference should be had to the following description taken in conjunction with the accompanying drawing wherein:

FIG. 1 is an elevation view of an improved load cell according to this invention;

FIG. 2 illustrates the manner in which a calibrated off axis load may be applied for investigation of load cell parameters;

FIG. 3 is a graph showing relative improvement in load cell performance and the optimum correlation obtainable according to this invention;

FIG. 4 is a diagram showing resolution of a non-axial load and an equipollent system;

FIG. 5 is the elastic curve diagram for the load cell column fixed at its lower end and supported at its upper end;

FIG. 6 illustrates an alternative load cell spring element cross section having an axially invariant bending moment of inertia; and FIG. 7 is a schematic showing of a circuit arrangement of strain gauges for generating load cell output indications.

With particular reference to FIG. 1, a preferred load cell configuration comprises a cylindrical spring element 12 in the form of a column and exhibiting similar circular cross sections about longitudinal axis A, a rigid base 14 of a generally annular configuration, a tubular rigid shell 16, and an annular diaphragm 18. The column 12 is rigidly fixed to the base at its lower end and is laterally supported at its upper end by diaphragm 18, the latter being welded or otherwise integrally attached to the column and to the shell. The conventional bonded resistance strain gauge transducer 20 is illustrated as comprising a plurality of parallel sensitive filaments 22 bonded by means of adhesive layer 24 to a position on the surface of the spring element 12 as more particularly explained hereinafter. Leads 26 from strain gauge 20 may be brought out through an aperture 28 in the shell 16 to conventional strain gauge readout circuitry. Optionally, the load cell housing may be completed by an annular bellows 30 which is sufficiently compliant so as not to affect operation of the active load cell elements.

As usually prescribed in the load cell art, the column 12 is of a material and of relative dimensions (for example, $L/D=3$ or 4) so that within the design load range elastic limits are not exceeded, the deflections are slight, and the action of the spring element under end loading is very nearly that of the theoretical simple column.

Application of an axial load, that is a load whose line of action is along A, will cause a shortening or extension of the column length in proportion to the magnitude of the load and a corresponding longitudinal compression or tension strain of the column surface. The active length of the column L is defined as the free length between base 14 and diaphragm 18 and surface dimensions within this length should vary in proportion to variations in the magnitude of an applied load. It was found early in the development of precision load cells, however, that certain end effects occur in the vicinity of the elements defining the ends of the free length of the column. For this reason, surface portions near the ends of the spring element were avoided and the mid point, at $L/2$ from either end, was chosen for the location of the strain sensing transducers. This orientation has become so entrenched in the art that it is now considered axiomatic for load cell designs.

I have discovered during specific research, including photoelastic model analysis and other observations, that anomalies in the output of a load cell may be sharply reduced by location of the transducer at a circumferential position which is one-third of the free column length from the fixed end of the column. Of course, a circumferential position is a line segment, but the optimum condition may be approached by symmetrically orienting the sensitive area of a transducer with respect to that line. This is depicted in FIG. 1 for the bonded resistance strain gauge 20, the sensitive filaments 22 being oriented to extend equally above and below the $L/3$ circumferential position. The strain gauge 20 is applied for the measurement of longitudinal strain variations but it could be rotated 90° to measure circumferential strain variations. Also, a combination of longitudinally or circumferentially sensitive strain gauges could be spaced apart along the circumference at the unique longitudinal position.

It should be realized that a pure axial load is not attainable in practice and that there is always some non-axial component to any real load. Non-axial components cause bending of the spring element superimposing compression and tension strains upon the axial load strain. These so-called parasitic load effects are variable and unpredictable. A load cell design is successful only insofar as it produces an output containing minimum parasitic loading effects.

An exaggerated application condition is illustrated in FIG. 2. Load cell 10′ is employed in a system where normal loads upon wedges 32 and 34 are transmitted along the direction of vector F′ at an angle $\theta'$ to the load cell axis A′. The perfect load cell would provide an indication equal to $F' \cos \theta$. This is a practical way of testing load cell configurations.

Precisely machined wedges 32 and 34 and a calibrated laboratory testing machine to deliver the known load F′ are employed in standard industrial specification tests. When such tests were run on the load cell configuration of this invention, it was found to be superior to conventional load cells. The experimental results are discussed in connection with the graph of FIG. 3. A Figure of Merit FM is defined to vary inversely with dependence of load cell output upon parasitic load magnitudes. For a given fixed and supported end configuration of a single column load cell, the Figure of Merit is plotted in FIG. 3 with the gauged surface position along the free column length from the fixed end toward the supported end as the independent variable. As expected, the Figure of Merit drops off to very low values for gauge positions near the column ends. However, the advantage of the load cell configuration according to this invention is very clearly shown relative to the prior mid-point location.

While it is clear that the lower trisection point is the most advantageous gauge position according to this invention, the range between 0.25L and 0.40L including that point gives significantly improved Figure of Merit and minimized parasitic dependence.

As a further explanation, FIG. 4 is a schematic illustration of the resolution of a generalized off-axis loading force F applied at an angle $\theta$ to the load cell column 12. The force F is represented by the simultaneous action of horizontal component H in the plane of diaphragm 18 and vertical component V at the distance e from axis A. The horizontal component will be balanced by an equal and opposite reaction in the diaphragm. The vertical component, however, not only produces compression of column 12 but, since its line of action does not coincide with the axis, it will produce a cross bending of the column. Since the force V is equipollent to the system V, V′, and V″, when the axial load is $|V|$, V and V″ constitute a couple of moment $M=|V|e$. The diaphragm 18 permits rotation of the adjacent end of column 12 and therefore the equilibrant of M must be generated by reaction of the column 12 in bending. Such bending is the source of the parasitic load cell effects finally obviated by this invention.

In an attempt to find a theoretical explanation for my discovery, FIG. 5 is drawn to represent at 36 the elastic curve configuration of the centroidal axis of the column 12 of FIG. 1 under the action of the moment $M=Ve$. A reaction R is set up in the diaphragm preventing deflection of that end of the column and the lower end of the column is fixed.

The y axis is the no-load position of the centroidal axis of the column. In practice the excursion of the elastic curve is so slight as to make it unnecessary to consider any bending produced by the axial load.

With these assumptions one can write the bending equation for the assumed column as follows:

$$EI\,d^2x/dy^2 = M - R(L-y) \qquad \text{I}$$

which relates the change in slope, the parasitic bending, at vertical position y to the elastic modulus, E; the bending moment of inertia, I; the applied moment, M; the reaction, R; and the free length of the column, L.

Integration of Equation I gives the slope for the elastic curve as:

$$EI\,dx/dy = (M-RL)y + Ry^2/2 \qquad \text{II}$$

The second integration gives the equation for the elastic curve as:

$$EIx = (M-RL)y^2/2 + Ry^3/6 \qquad \text{III}$$

The limiting condition that the deflection must be zero at the supported column end allows the simultaneous substitution of $x=0$ and $y=L$ in Equation III yielding the relationship:

$$M = 2RL/3 \qquad \text{IV}$$

for moment M in terms of the reaction R and the free length of the column.

By substituting the relationship IV in Equation I and setting the second derivative equal to zero, the position of minimum parasitic bending effect is found to be:

$$y = L/3 \qquad \qquad V$$

which coincides with and reinforces applicant's discovery that parasitic loading effects are minimized at the first trisectional circumferential position from the fixed end of a column supported and loaded at the opposite end.

It is interesting to note that at the optimum gauging position there is significant deflection of the elastic curve.

It is of further significance that lateral cross sectional area and shape do not enter into the elastic curve equations so long as the bending moment of inertia I remains invariant along the y axis. This may explain why applicant has found that the objects of his invention are obtainable with noncircular spring element configurations such as the square depicted in FIG. 6, hollow columns, and even triangular columns. This latter discovery is a very significant advantage to load cell designers restricted as they are by limitations of economy, strain concentration, deflection ratio, and the like. Therefore, whenever the term cylinder in any of its forms is employed in this specification, it is to be given its generic scope—a solid bounded by a surface, or two surfaces in the case of a hollow cylinder, traced by a straight line moving parallel to a fixed line.

FIG. 7 is an example of a bridge circuit arrangement of gauges $G_1$, $G_2$, $G_3$ and $G_4$ corresponding respectively to the bonded resistance gauges 37, 38, 39 and 40 of FIG. 6. All four bridge arms actively contribute to bridge output under load and inherent temperature compensation is provided by alternating circumferentially and longitudinally sensitive gauges in adjacent bridge arms.

In FIG. 6, each of the gauges 37, 38, 39 and 40 is located longitudinally symmetrically with respect to the circumferential line 41 at the lower (closer to the base) trisection position on the free length of the column 42 as measured between the fixed (base) end and the supported (diaphragm) end. Whether oriented to sense longitudinal or circumferential strain or otherwise directed in their application to alternative column designs, gauges located at this longitudinal position have been found to respond directly to axial load strains very nearly independently of off-axis, skew, or parasitic loading effects. For optimum results, however, I have found that all strain sensitive portions of the active gauges should be located within the longitudinal position between 0.25L and 0.40L from the fixed end of a column of free length L between fixed and supported ends.

My invention has been described herein with particular reference to bonded resistance strain gauges and certain other specific elements for purposes of illustration only. Obvious modifications and substitutions will occur to those skilled in the art and, therefore, no restrictions are intended except as defined by the appended claims.

What is claimed is:

1. A load cell combination comprising a cylindrical spring element column, a rigid base fixing one end of said column, a rigid shell fixed to said base and encompassing said column, a lateral diaphragm flexible longitudinally of said column attached to said column and to said shell hinging said column for rotation and restraining said column against lateral deflection, said diaphragm and said base defining therebetween an active length for said column, the cross-sectional configuration of said column being constant over said active length, and strain gauging means operatively attached to said column symmetrically of the circumferential column position spaced one third of the active length of said column from said base.

2. A load cell combination comprising a spring element column having planar longitudinal sides all of which are parallel with the longitudinal axis of said column, a rigid base fixing one end of said column, a lateral diaphragm flexible longitudinally of said column attached to said column and to said shell omnidirectionally hinging said column for rotation and restraining said column against lateral deflection, said diaphragm and said base defining therebetween an active length for said column, the cross-sectional configuration of said column being constant over said active length, and a plurality of strain gauging means each operatively attached to one of said sides symmetrically of the circumferential column position spaced one third of the active length of said column from said base.

3. A load cell combination comprising a cylindrical spring element column, a rigid base fixing one end of said column, a rigid shell fixed to said base and encompassing said column, a lateral diaphragm flexible longitudinally of said column attached to said column and to said shell omnidirectionally hinging said column for rotation and restraining said column against lateral deflection, said diaphragm and said base defining therebetween an active length L for said column, the cross-sectional configuration of said column being constant over said active length, and strain gauging means operatively attached to said column within the area between the circumferential column positions at 0.25L and 0.40L from said base, said means being oriented longitudinally symmetrically with respect to the circumferential column position at 0.33L from said base.

4. A load cell combination comprising a spring element column having planar longitudinal sides all of which are parallel with the longitdinal axis of said column, a rigid base fixing one end of said column, a lateral diaphragm flexible longitudinally of said column attached to said column and to said shell omnidirectionally hinging said column for rotation and restraining said column against lateral deflection, said diaphragm and said base defining therebetween an active length L for said column, the cross-sectional configuration of said column being constant over said active length, and a plurality of strain gauging means each operatively attached to one of said sides within the area between the circumferential column positions at 0.25L and 0.40L from said base and oriented longitudinally symmetrically with respect to the circumferential column position at 0.33L from said base.

5. A load cell combination comprising a cylindrical spring element column, a rigid base fixing one end of said column, a rigid shell fixed to said base and encompassing said column, a lateral diaphragm flexible longitudinally of said column attached to said column and to said shell omnidirectionally hinging said column for rotation and restraining said column against lateral deflection, said diaphragm and said base defining therebetween an active length L for said column, the cross-sectional configuration of said column being constant over said active length, and four bonded resistance strain gauges each consisting essentially of a plurality of parallel strain sensitive filaments and each being operatively attached to said column within the area between the circumferential column positions at 0.25L and 0.40L from said base and symmetrically with respect to the circumferential column position at 0.33L from said base, the filaments of the first and third of said gauges being longitudinal of said column and the filaments of the second and fourth of said gauges being circumferential of said column, and the first, second, third, and fourth gauges being connected in that order in adjacent arms of a four-arm strain gauge bridge network.

6. A load cell combination comprising a spring element column having four planar longitudinal sides all of which are parallel with the longitudinal axis of said column, a rigid base fixing one end of said column, a lateral diaphragm flexible longitudinally of said column attached to said column and to said shell omnidirectionally hinging said column for rotation and restraining said column against lateral deflection, said diaphragm and said base defining therebetween an active length L for said column, the cross-sectional configuration of said column being constant over said active length, and four bonded resistance strain gauges each consisting essentially of a plurality of parallel strain sensitive filaments and each being operatively attached to a different one of said sides within the area between the circumferential column positions at 0.25L and 0.40L from said base and symmetrically with respect to the circumferential column position at 0.33L from said base, the filaments of the first and third of said gauges being longitudinal of said column and the filaments of the second and fourth of said gauges being circumferential of said column, and the first, second, third, and fourth gauges being connected in that order in adjacent arms of a four-arm strain gauge bridge network.

References Cited by the Examiner

UNITED STATES PATENTS

| | | | |
|---|---|---|---|
| 2,458,481 | 1/49 | Ruge | 73—141 |
| 2,488,347 | 11/49 | Thurston | 338—5 |
| 2,666,262 | 1/54 | Ruge | 33—148 |

OTHER REFERENCES

Shanley, F. R.: "Strength of Materials," McGraw-Hill Book Co., Inc., New York, 1957, page 575, Fig. 24.8(d).

RICHARD C. QUEISSER, *Primary Examiner.*

JOSEPH P. STRIZAK, *Examiner.*